US008522100B2

(12) United States Patent
Miki et al.

(10) Patent No.: US 8,522,100 B2
(45) Date of Patent: Aug. 27, 2013

(54) RADIO COMMUNICATION APPARATUS AND A METHOD OF TRANSMITTING A RETRANSMISSION PACKET

(75) Inventors: Nobuhiko Miki, Yokohama (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1031 days.

(21) Appl. No.: 12/161,174

(22) PCT Filed: Jan. 15, 2007

(86) PCT No.: PCT/JP2007/050386
§ 371 (c)(1),
(2), (4) Date: Oct. 15, 2008

(87) PCT Pub. No.: WO2007/083584
PCT Pub. Date: Jul. 26, 2007

(65) Prior Publication Data
US 2010/0088567 A1    Apr. 8, 2010

(30) Foreign Application Priority Data

Jan. 17, 2006  (JP) ................................. 2006-009295

(51) Int. Cl.
*G08C 25/02*     (2006.01)

(52) U.S. Cl.
USPC ........................................................ 714/748

(58) Field of Classification Search
USPC ........................................................ 714/748
See application file for complete search history.

(56) References Cited

U.S. PATENT DOCUMENTS

| 5,896,402  | A  * | 4/1999  | Kurobe et al. ................. 714/748 |
| 7,583,968  | B2 * | 9/2009  | Kimura ........................... 455/450 |
| 7,606,222  | B2 * | 10/2009 | Bronner et al. ................ 370/352 |
| 7,631,247  | B2 * | 12/2009 | Petrovic et al. ................ 714/776 |
| 7,979,768  | B2 * | 7/2011  | Sammour et al. .............. 714/748 |
| 2004/0199846 | A1 | 10/2004 | Matsumoto et al. |
| 2007/0238462 | A1 * | 10/2007 | Pedersen ....................... 455/436 |
| 2008/0080465 | A1 * | 4/2008 | Pajukoski et al. .............. 370/342 |
| 2008/0225783 | A1 * | 9/2008 | Wang et al. .................... 370/329 |
| 2009/0082046 | A1 * | 3/2009 | Shoji ............................. 455/509 |

FOREIGN PATENT DOCUMENTS

| CN | 1545775 A      | 11/2004 |
| JP | 7-030523 A     | 1/1995  |
| JP | 11-215092 A    | 8/1999  |
| JP | 2002-527938 A  | 8/2002  |
| JP | 2004-112471 A  | 4/2004  |
| JP | 2004-140740 A  | 5/2004  |
| JP | 2004-312291 A  | 11/2004 |
| JP | 2005-286753 A  | 10/2005 |

(Continued)

OTHER PUBLICATIONS

Office Action mailed Apr. 14, 2009, Issued with respect to the Japanese Patent Application No. 2006-009295; 7 pgs.

(Continued)

*Primary Examiner* — Albert Decady
*Assistant Examiner* — Enam Ahmed

(57) ABSTRACT

A radio communication apparatus having a retransmission function includes a pattern storing unit configured to store a correspondence between resource blocks used for a transmission packet and resource blocks used for a retransmission packet; and a packet scheduling unit configured to arrange the retransmission packet based on the correspondence.

8 Claims, 11 Drawing Sheets

(56) References Cited

FOREIGN PATENT DOCUMENTS

| JP | 2007-194747 A | 8/2007 |
|---|---|---|
| WO | 2004/038990 A1 | 5/2004 |
| WO | 2006054133 A1 | 5/2006 |
| WO | WO 2006054133 A1 * | 5/2006 |

OTHER PUBLICATIONS

Patent Abstracts of Japan for Japanese patent application with Publication No. 2004-312291, Publication Date: Nov. 4, 2004; 1 pg.
Patent Abstracts of Japan for Japanese patent application with Publication No. 2005-286753, Publication Date: Oct. 13, 2005; 1 pg.
Office Action issued in related Russian patent application No. 2008132768; Dated Jun. 25, 2010 (8 pages).
Chinese Office Action for Application No. 200780007744.4, mailed on Jan. 4, 2011 (11 pages).
esp@cenet Patent Abstract for Chinese Publication No. 1545775, publication date Nov. 10, 2004. (1 page).
3GPP TS 25.212, "3rd Generation Partnership Project; Technical Specification Group Radio Access Network; Multiplexing and Channel Coding (FDD)" (Release 6), V6.7.0, 2005, (84 pages).
International Search Report w/translation from PCT/JP2007/050386 dated Apr. 3, 2007 (5 pages).
Written Opinion from PCT/JP2007-050386 dated Apr. 3, 2007 (3 pages).
Japanese Office Action for Application No. 2009-127544, mailed on Nov. 15, 2011 (9 pages).
Patent Abstracts of Japan for Japanese Publication No. 2007-194747, publication date Aug. 2, 2007 (1 page).
Extended European Search Report for Application No. 07706727.0, mailed on Sep. 5, 2012 (10 pages).
Kumagai T et al, "A Maximal Ratio Combining Frequency Diversity ARQ Scheme for OFDM Signals" Personal, Indoor and Mobile. Radio Corrmunications, 1998. The Ninth IEEE International Symposium on Boston, MA, USA, Sep. 8-11, 1998, vol. 2.
Liyu Cal et al, "Improved HARQ scheme using channel quality feedback for OFDM systems", Proceedings, 2004 IEEE 59th Vehicular Technology Conference, VTC 2004-Spring: Towards a Global Wireless World; May 17-19, 2004, Milan, Italy, vol. 4.
Mikael Gidlund et al., "Enhanced HARQ scheme based on rearrangement of signal constellations and frequency diversity for OFDM systems", 2004 IEEE 59th Vehicular Technology Conference, vol. 1, May 17, 2004.

* cited by examiner

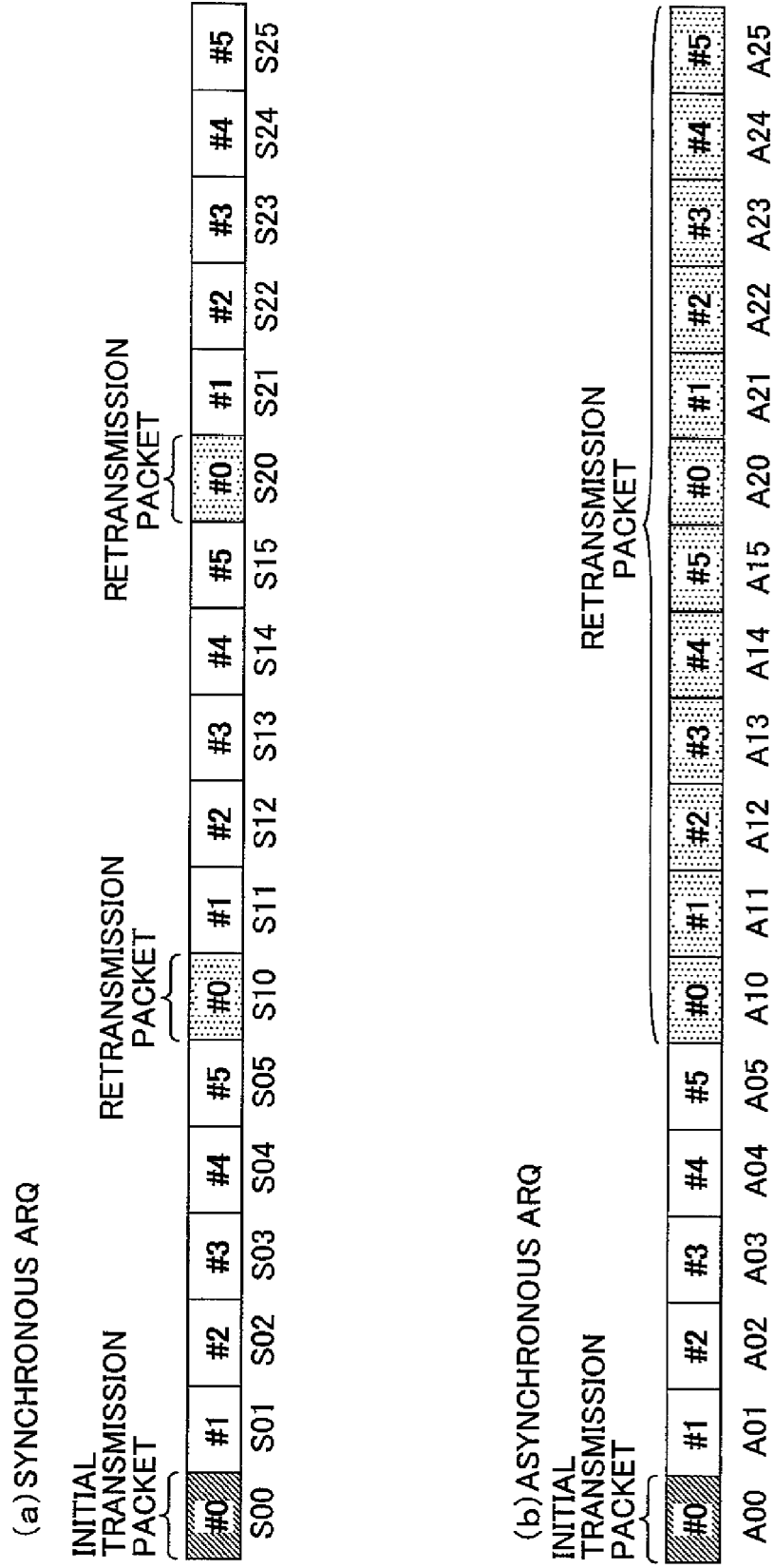

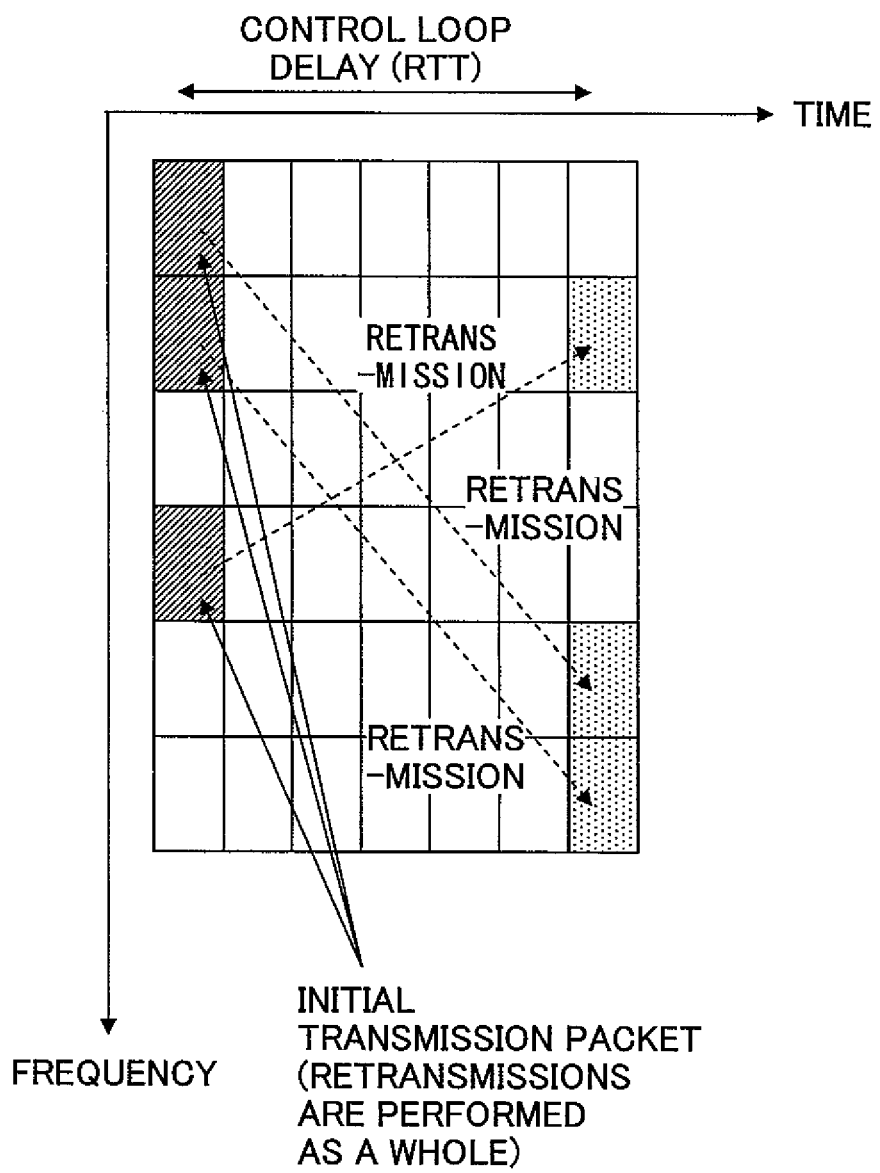

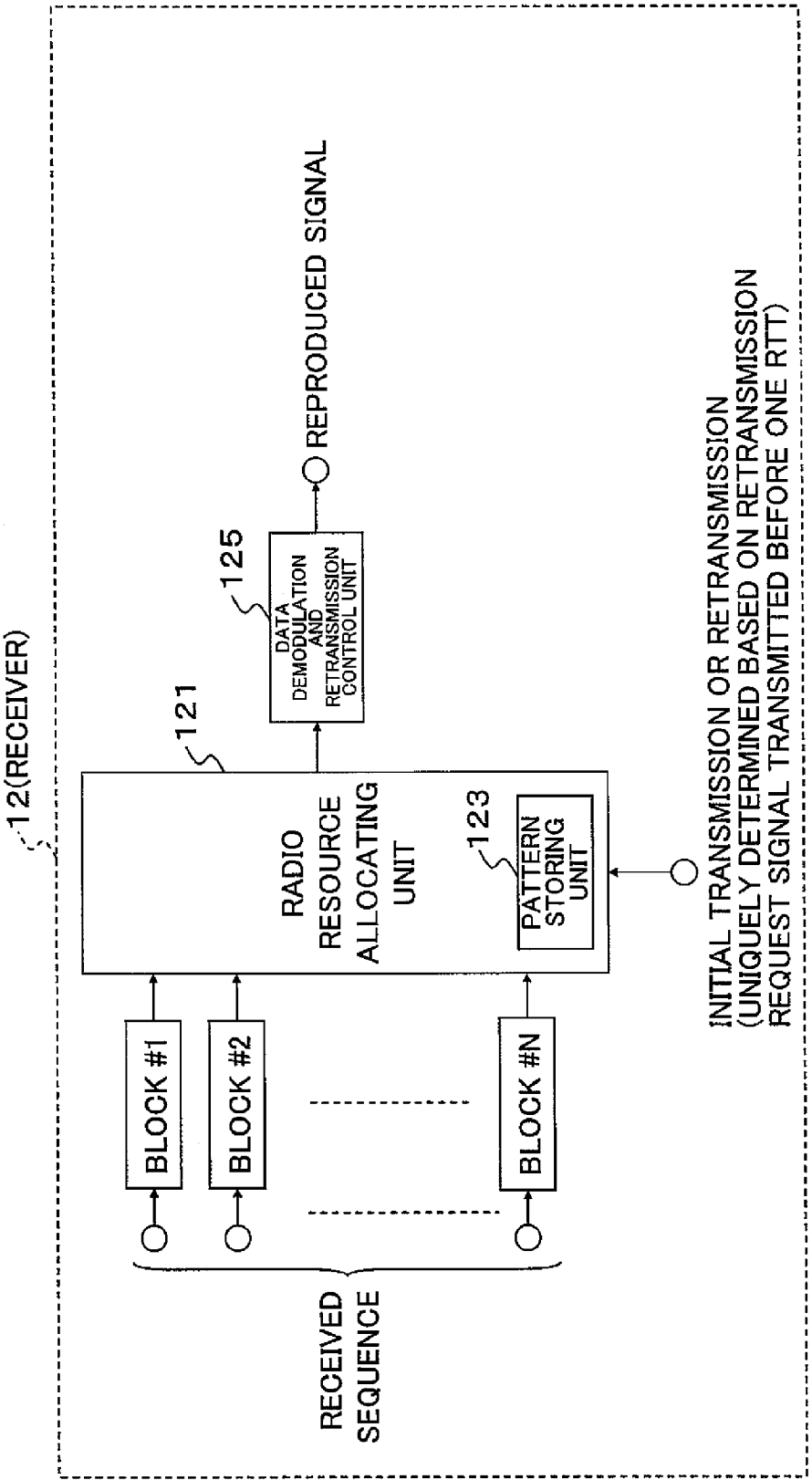

RADIO COMMUNICATION APPARATUS AND A METHOD OF TRANSMITTING A RETRANSMISSION PACKET

BACKGROUND OF THE INVENTION

1. Field of the Invention

The present invention relates to a radio communication apparatus and a method of transmitting a retransmission packet with multiple resource blocks.

2. Description of the Related Art

Hybrid ARQ (Hybrid Automatic Repeat request) includes existing ARQ functions (error detection function and retransmission function) and an error correction function. According to Hybrid ARQ, the number of packet retransmissions can be reduced by transmitting an error correction code in advance.

There are two types of Hybrid ARQ schemes as shown in FIG. 1. One scheme is referred to as Synchronous ARQ and the other scheme is referred to as Asynchronous ARQ.

According to Synchronous ARQ, packets are retransmitted at predetermined retransmission timings. For example, a transmission packet at a timing #0 (S00) is detected as an error packet, corresponding retransmission packets can be transmitted at timings #0 (S10 and S20). In other words, retransmissions are performed at frames which are integral multiples of RTT (Round Trip Time) or control loop delay.

Synchronous ARQ has an advantage that the process number indicating the original transmission packet for retransmission packets does not have to be provided as control bits and thus overhead can be reduced, because retransmission timings are determined in advance. Synchronous ARQ also has an advantage that retransmission processing can be simplified. However, Synchronous ARQ has a disadvantage that it does not have flexibility in scheduling retransmission packets and allocating TTIs (Transmission Time Intervals or subframes) to them, because of the constraints of retransmission timings. Furthermore, when a packet cannot be retransmitted after one RTT from the initial transmission packet, the packet has to wait for at least two RTTs and thus delay may be increased.

On the other hand, according to Asynchronous ARQ, packets are retransmitted at any timing after one RTT. For example, a transmission packet at a timing #0 (A00) is detected as an error packet, corresponding retransmission packets can be transmitted at any timing (TTI) after A10. In other words, retransmissions are performed at any timing (A10-A25) after one RTT from the transmission packet. It is noted that Asynchronous ARQ is used in HSDPA (High Speed Downlink Packet Access) (for example, Non-Patent Reference 1).

Asynchronous ARQ has an advantage that it has flexibility in scheduling retransmission packets. In addition, when a packet cannot be retransmitted after one RTT from the initial transmission packet, the packet can be transmitted after timings of (RTT+1) rather than after two RTTs and thus delay may be reduced. However, Asynchronous ARQ has a disadvantage that retransmission processing can be complicated. Furthermore, the process number has to be provided as control bits and thus overhead can be increased.

[Non-Patent Reference 1] 3GPP TS 25.212, "Multiplexing and channel coding (FDD)"

SUMMARY OF THE INVENTION

Problem(s) to be Solved by the Invention

The use of Synchronous ARQ or Asynchronous ARQ in frequency domain scheduling, where the frequency bandwidth are divided into multiple resource blocks, presents the following problems.

As shown in FIG. 2A, retransmissions according to Synchronous ARQ are performed using the same resource block (frequency block). When the resource block is of poor reception quality, there is a high likelihood that an error will be detected again in retransmission packets.

On the other hand, retransmissions according to Asynchronous ARQ are performed using optimum resource blocks. However, as shown in FIG. 2B, an optimum resource block for each retransmission packet is selected from the resource blocks after one RTT and thus retransmission processing can be complicated.

In view of the aforementioned problems in the related art, it is a general object of the present invention to improve retransmission performance using a correspondence between resource blocks used for a transmission packet and resource blocks used for a retransmission packet.

Means for Solving the Problem

In one embodiment of the present invention, there is provided a radio communication apparatus having a retransmission function for transmitting a retransmission packet, when an error is detected in a transmission packet which is transmitted with multiple resource blocks, including:

a pattern storing unit configured to store a correspondence between resource blocks used for the transmission packet and resource blocks used for the retransmission packet; and a packet scheduling unit configured to arrange the retransmission packet based on the correspondence.

In one embodiment of the present invention, there is provided a method of transmitting a retransmission packet from a transmitting radio communication apparatus, when a receiving radio communication apparatus detects an error in a transmission packet which is transmitted with multiple resource blocks from the transmitting radio communication apparatus, including the steps of:

storing, by both the transmitting radio communication apparatus and the receiving radio communication apparatus, a correspondence between resource blocks used for the transmission packet and resource blocks used for the retransmission packet;

arranging, by the transmitting radio communication apparatus, the retransmission packet based on the correspondence, and transmitting the retransmission packet to the receiving radio communication apparatus; and detecting, by the receiving radio communication apparatus, an error in the retransmission packet based on the correspondence.

Effect of the Invention

According to an embodiment of the present invention, a frequency diversity effect can be obtained for a retransmission packet and retransmission performance can be improved.

BRIEF DESCRIPTION OF THE DRAWINGS

FIG. 1 shows two types of Hybrid ARQ schemes in accordance with the related art.

FIG. 3B shows scheduling of retransmission packets in accordance with an embodiment of the present invention.

FIG. 4B shows a receiver of a communication system in accordance with an embodiment of the present invention.

DESCRIPTION OF THE PREFERRED EMBODIMENTS

Figure 2A:
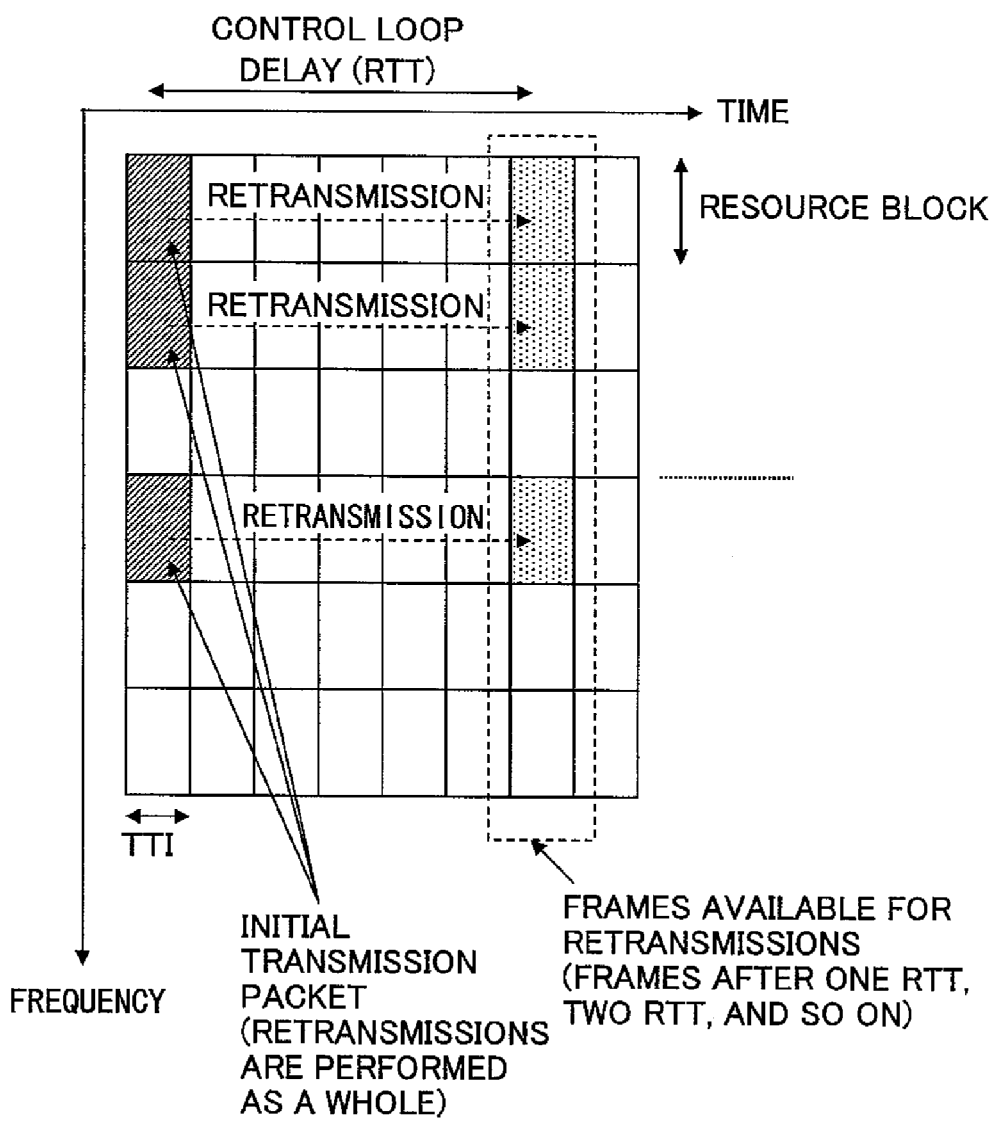
FIG. 2A shows scheduling of retransmission packets according to Hybrid ARQ (Synchronous ARQ) in the case of frequency domain scheduling.
Figure 2B:
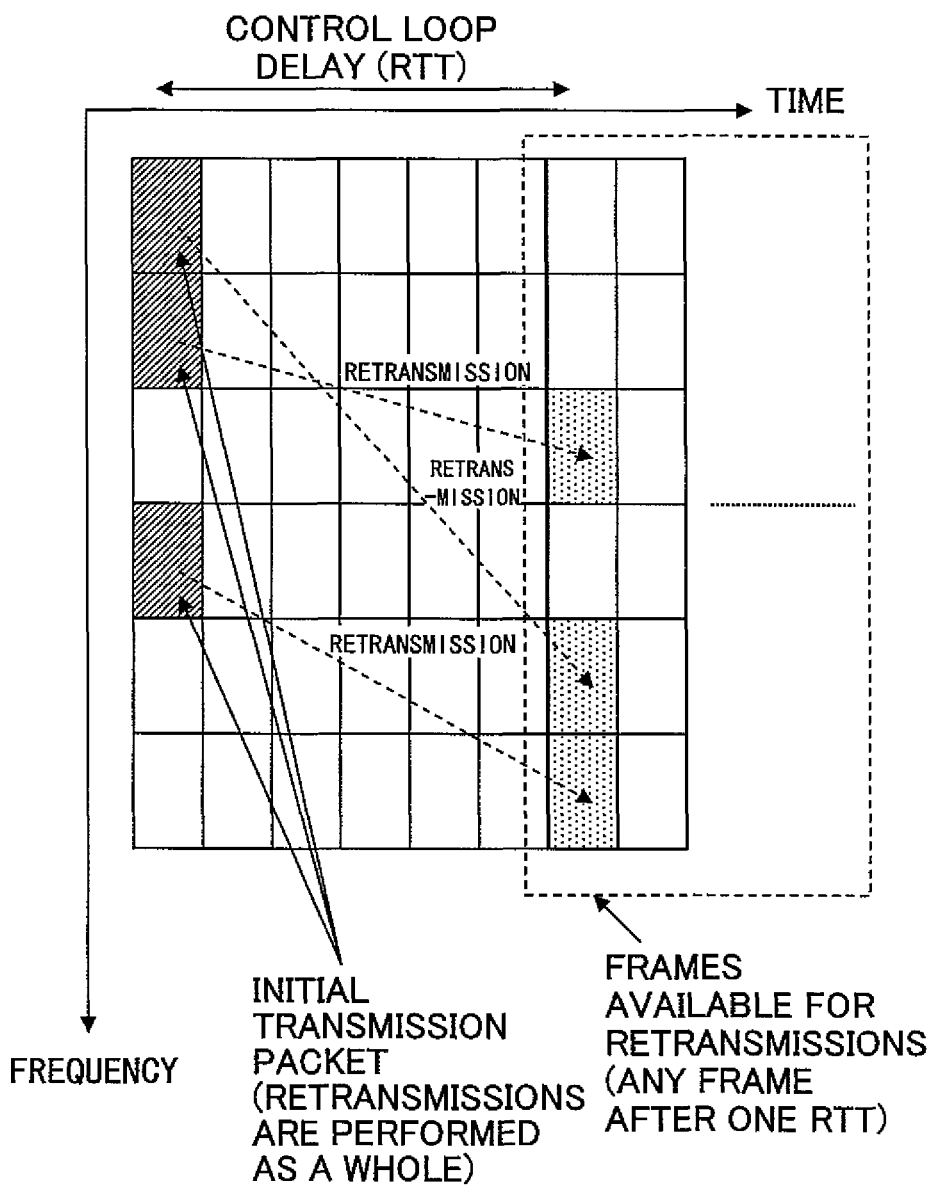
FIG. 2B shows scheduling of retransmission packets according to Hybrid ARQ (Asynchronous ARQ) in the case of frequency domain scheduling.

Description of Notations 10 transmitting radio communication apparatus
12 receiving radio communication apparatus
103 pattern storing unit
105 packet scheduling unit
107 channel coding unit
109 data modulation unit
111 radio resource allocating unit
121 radio resource allocating unit
123 pattern storing unit
125 data demodulation and retransmission control unit

BEST MODE OF CARRYING OUT THE INVENTION

With reference to the accompanying drawings, a description is given below with regard to preferred embodiments of the present invention.

Figure 3A:
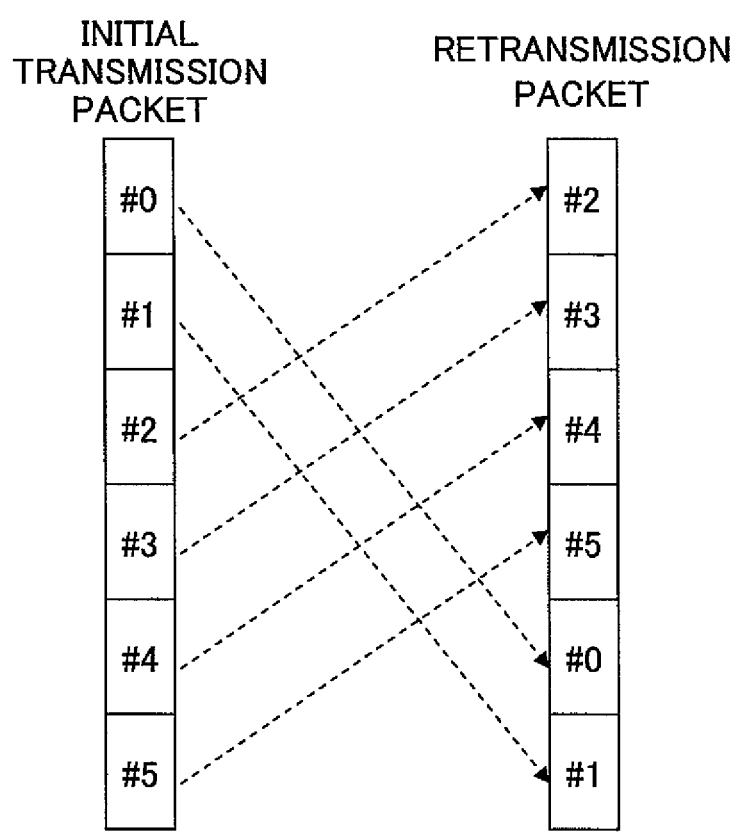
FIG. 3A shows a correspondence between a transmission packet and a retransmission packet in accordance with an embodiment of the present invention.

FIGS. 3A and 3B show scheduling of retransmission packets in accordance with an embodiment of the present invention. In contrast to Synchronous ARQ in accordance with the related art, a retransmission scheme of the present embodiment uses different resource blocks (frequency blocks) for the original transmission packet (also referred to as an initial transmission packet) and retransmission packets. As shown in FIG. 3A, a retransmission packet is arranged by changing the sequence (order) of resource blocks for the initial transmission packet in a predetermined manner. Such a correspondence is stored in both a transmitting radio communication apparatus and a receiving radio communication apparatus in advance. As shown in FIG. 3B, the transmitting radio communication apparatus arranges a retransmission packet based on the correspondence stored in both the transmitting radio communication apparatus and the receiving radio communication apparatus in advance, and transmits the retransmission packet to the receiving radio communication apparatus after one RTT. The receiving radio communication apparatus can detect (and correct) an error based on the correspondence.

In this manner, applying frequency hopping to the retransmission packet can obtain a frequency diversity effect for the retransmission packet, because different resource blocks in the frequency domain are used for the retransmission packet.

Exemplary Structure

Figure 4A:
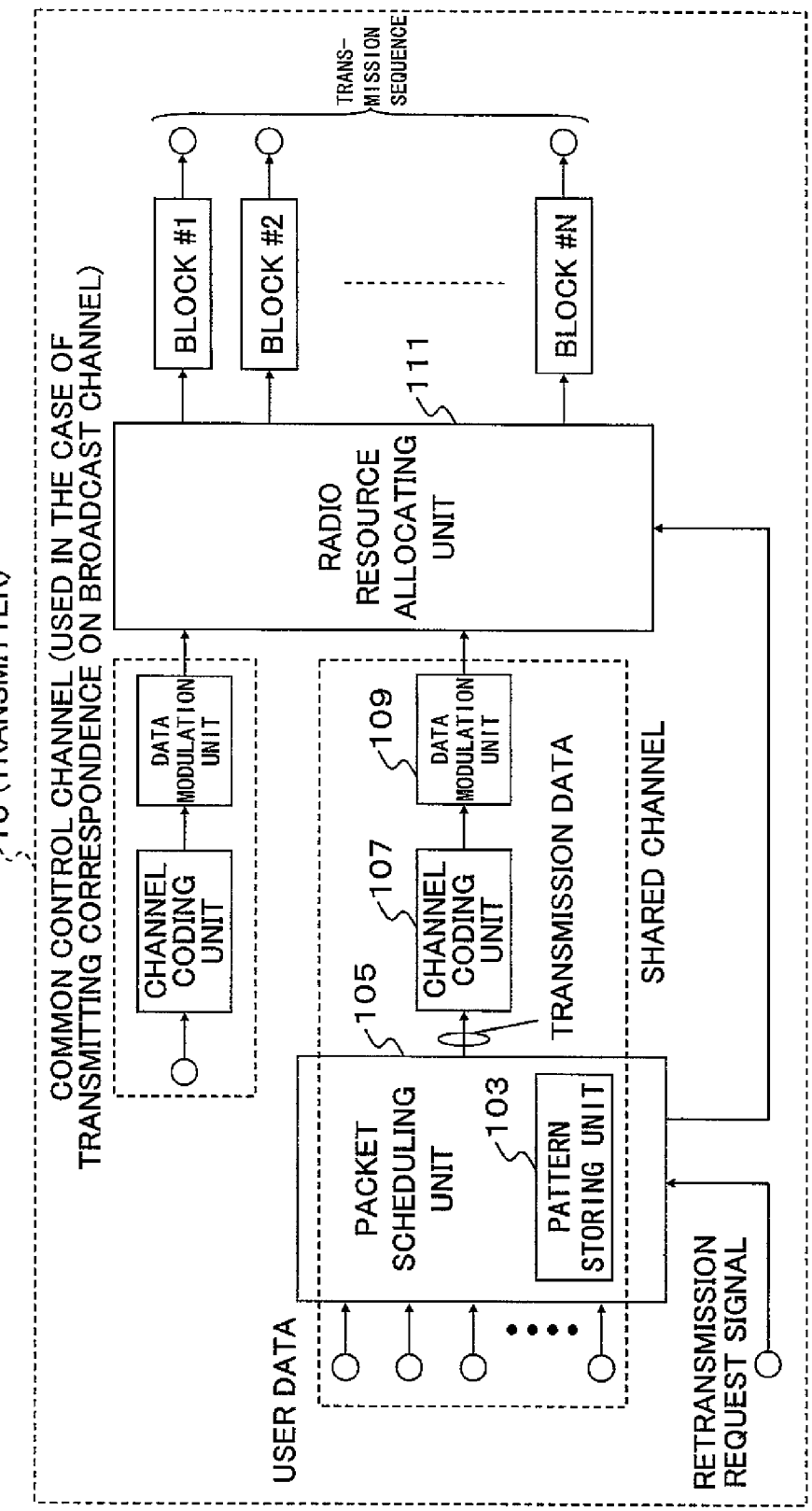
FIG. 4A shows a transmitter of a communication system in accordance with an embodiment of the present invention.

FIGS. 4A and 4B show a structure of a communication system in accordance with an embodiment of the present invention. The communication system includes a transmitting radio communication apparatus (transmitter) 10 as shown in FIG. 4A and a receiving radio communication apparatus (receiver) 12 as shown in FIG. 4B.

Although the transmitting radio communication apparatus 10 is typically used for a base station in a radio communication system, the transmitting radio communication apparatus 10 may be used for other apparatuses such as a mobile station. The transmitting radio communication apparatus 10 includes a pattern storing unit 103, a packet scheduling unit 105, a channel coding unit 107, a data modulation unit 109, and a radio resource allocating unit 111.

The pattern storing unit 103 stores a correspondence between resource blocks used for a transmission packet and resource blocks used for a retransmission packet. As described below, the pattern storing unit 103 may store the correspondence up to the maximum number of retransmissions. Alternatively, the pattern storing unit 103 may store a predetermined correspondence which can be used for generating an allocation pattern of resource blocks for retransmission packets based on the initial transmission packet.

The packet scheduling unit 105 receives respective user data and arranges a transmission packet or a retransmission packet. In the case of the initial transmission packet, the packet scheduling unit 105 allocates resource blocks #1-#N to respective user data based on feedback information such as signal quality. In the case of the retransmission packet (upon receiving a retransmission request signal from the receiving radio communication apparatus), the packet scheduling unit 105 arranges the retransmission packet for user data based on the correspondence stored in the pattern storing unit 103. For example, the packet scheduling unit 105 changes the sequence of resource blocks so that resource blocks for the retransmission packet are different from resource blocks for the initial transmission packet, as shown in FIG. 3B.

The channel coding unit 107 encodes transmission data (transmission packet or retransmission packet) arranged by the packet scheduling unit 105 according to any coding algorithm. The data modulation unit 109 modulates data encoded by the channel coding unit 107. Data modulation may be performed using a modulation scheme suited for each resource block. For example, the modulation unit 109 uses various modulation schemes such as QPSK, 16QAM, and 64QAM. The radio resource allocating unit 111 allocates resource blocks #1-#N based on scheduling by the packet scheduling unit 105.

As described below, a common control channel is used for transmitting the correspondence stored in the pattern storing unit 103 to the receiving radio communication apparatus 12.

The receiving radio communication apparatus 12 includes a radio resource allocating unit 121, a pattern storing unit 123, and a data demodulation and retransmission control unit 125.

The pattern storing unit 123 stores the same correspondence as the one stored in the pattern storing unit 103 in the transmitting radio communication apparatus 10. The pattern storing unit 123 may store the correspondence uniquely determined by both the transmitting radio communication apparatus 10 and the receiving radio communication apparatus 12. Alternatively, the pattern storing unit 123 may store the same correspondence as the one stored in the pattern storing unit 103 by exchanging the correspondence between the transmitting radio communication apparatus 10 and the receiving radio communication apparatus 12.

The radio resource allocating unit 121 recognizes in advance whether a packet corresponds to an initial transmission packet or a retransmission packet based on a retransmission request signal transmitted before one RTT. In the case of the initial transmission packet, the radio resource allocating unit 121 extracts predetermined resource blocks from resource blocks #1-#N. In the case of the retransmission packet, the radio resource allocating unit 121 extracts, based on the correspondence stored in the pattern storing unit 123, resource blocks used for the retransmission packet from resource blocks #1-#N. The data demodulation and retransmission control unit 125 demodulates the extracted resource blocks and reproduces user data. Then, the data modulation and retransmission control unit 125 detects (and corrects) an error and transmits a retransmission request signal to the transmitting radio communication apparatus 10 as needed.

Schemes for Determining the Correspondence

Figure 5:
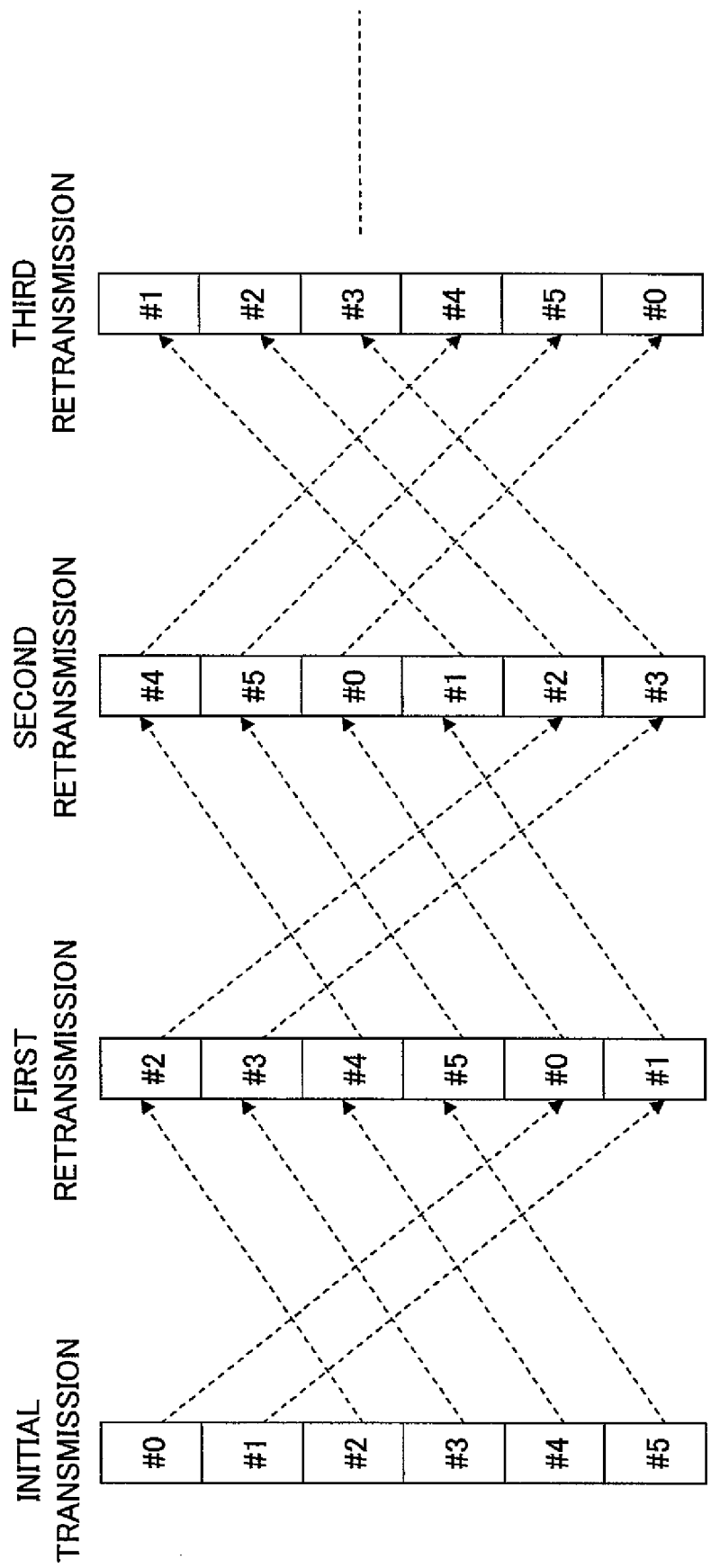
FIG. 5 shows a first correspondence between resource blocks used for an initial transmission packet and resource blocks used for retransmission packets.

FIG. 5 shows a first correspondence between resource blocks used for an initial transmission packet and resource blocks used for retransmission packets. For the first correspondence, both the transmitting radio communication apparatus 10 and the receiving radio communication apparatus 12 determine the correspondence up to the maximum number of retransmissions in advance. The transmitting radio communication apparatus 10 arranges a retransmission packet based on the correspondence and the receiving radio communication apparatus 12 demodulates data based on the correspondence. According to the first correspondence, flexibility of patterns in the correspondence can be increased. In addition, it is possible to determine the correspondence which maximizes a (frequency) diversity effect in advance. On the other hand, the amount of information for storing the correspondence grows with increase of the maximum number of retransmissions.

Figure 6:
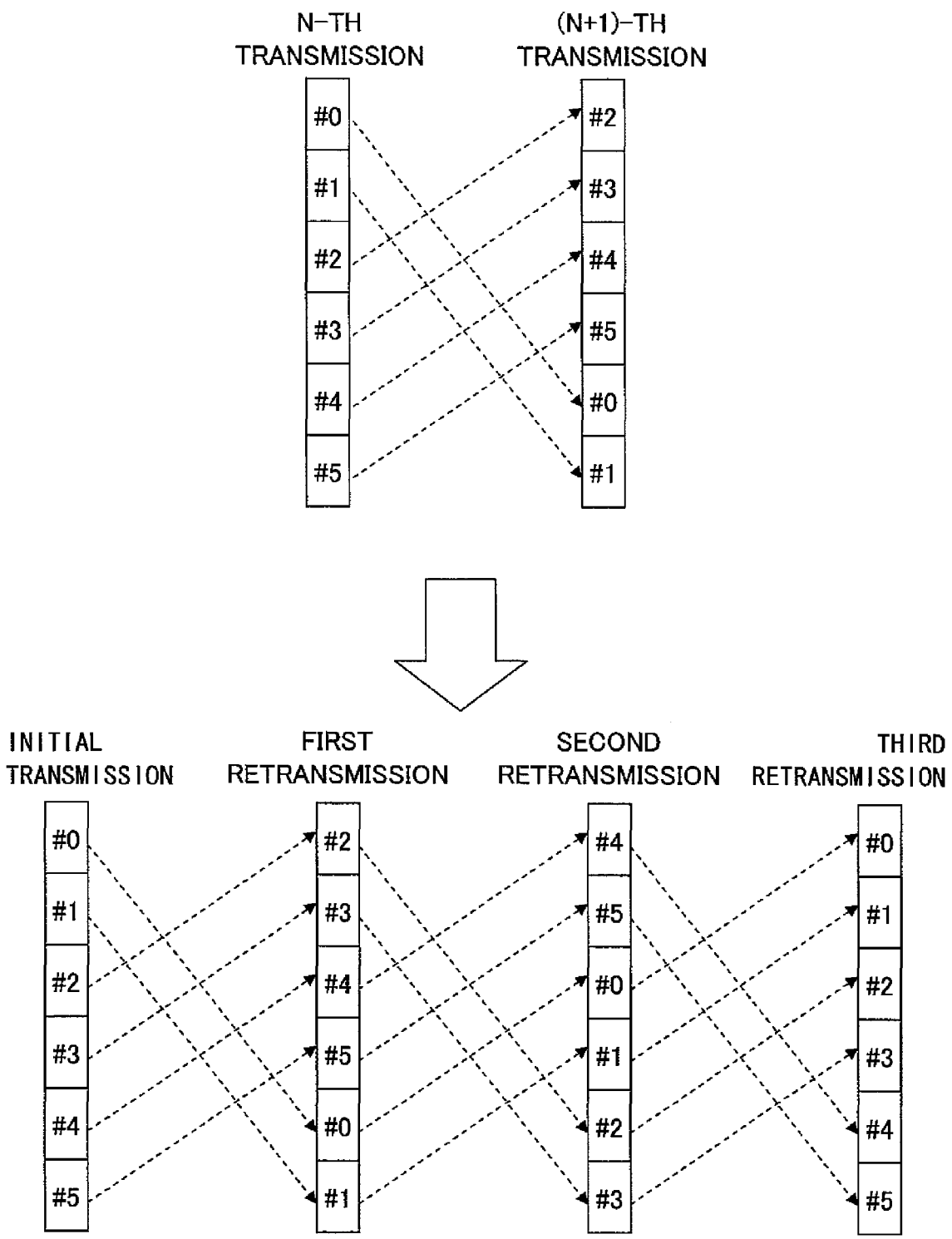
FIG. 6 shows a second correspondence between resource blocks used for an initial transmission packet and resource blocks used for retransmission packets.

FIG. 6 shows a second correspondence between resource blocks used for an initial transmission packet and resource blocks used for retransmission packets. For the second correspondence, both the transmitting radio communication apparatus 10 and the receiving radio communication apparatus 12 determine the correspondence between resource blocks at an n-th transmission timing and resource blocks at an (n+1)-th transmission timing in advance. According to the second correspondence, the amount of information for storing the correspondence can be reduced compared to the scheme shown in FIG. 5. On the other hand, resource blocks used for the third retransmission packet may be identical with resource blocks used for the initial transmission packet, for example. For this reason, a lesser (frequency) diversity effect may be obtained compared to the scheme shown in FIG. 5.

Figure 7:
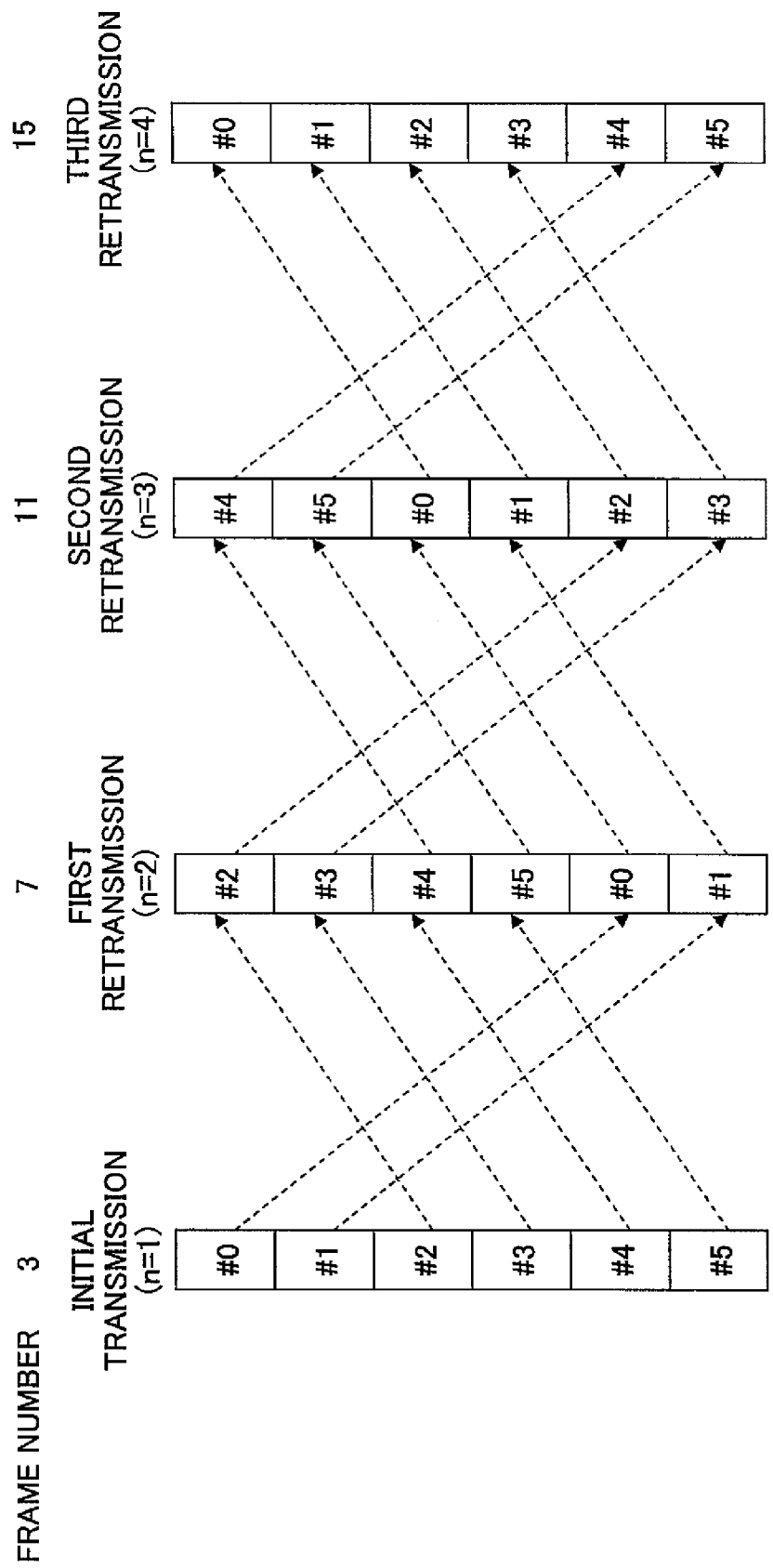
FIG. 7 shows a third correspondence between resource blocks used for an initial transmission packet and resource blocks used for retransmission packets.

FIG. 7 shows a third correspondence between resource blocks used for an initial transmission packet and resource blocks used for retransmission packets. For the third correspondence, both the transmitting radio communication apparatus 10 and the receiving radio communication apparatus 12 generate the correspondence based on a variable which is included in both the transmitting radio communication apparatus 10 and the receiving radio communication apparatus 12 in common. For example, because a frame number is broadcast as system information, the pattern (correspondence) can be generated using the frame number as the variable. For example, the pattern (correspondence) may be generated from the frame number based on the following equation:

$$\text{Chunk}(n+1)=(\text{Chunk}(n)+\Delta FN) \bmod (\text{MAX\_CHUNK})$$

where n represents the number of transmission times (n=1 for the initial transmission packet and n=2 for the first retransmission packet). Chunk(n) represents a resource block number used for transmitting data at an n-th transmission timing. In FIG. 7, Chunk(n) corresponds to the number selected from 0-5, since six resource blocks are included in the packet. Chunk(n) is equal to 0 for the resource block #0 in the initial transmission packet and equal to 1 for the resource block #1 in the initial transmission packet. $\Delta FN$ represents a variation for the frame number ($\Delta FN$ is equal to 4 in FIG. 7). MAX_CHUNK represents the maximum number of resource blocks (MAX_CHUNK is equal to 6 in FIG. 7).

Based on the aforementioned equation, the resource block (Chunk(n+1)) used for the first retransmission packet corresponding to the initial transmission packet #0 is determined as Chunk(n+1)=(0+4)mod(6)=4. According to the third correspondence, the amount of information for storing the correspondence can be reduced compared to the scheme shown in FIG. 5. On the other hand, resource blocks used for the third retransmission packet may be identical with resource blocks used for the initial transmission packet, for example. For this reason, a lesser (frequency) diversity effect may be obtained compared to the scheme shown in FIG. 5.

Schemes for Transmitting the Correspondence

In order for both the transmitting radio communication apparatus 10 and the receiving radio communication apparatus 12 to have the correspondence in common, schemes for transmitting the correspondence from one apparatus to the other apparatus are described below.

In a first scheme, the pattern storing units (103 in FIG. 4A and 123 in FIG. 4B) in both the transmitting radio communication apparatus 10 and the receiving radio communication apparatus 12 store the correspondence in common which is uniquely determined in advance. The first scheme can reduce overhead, because the correspondence does not have to be transmitted from the transmitting radio communication apparatus 10 to the receiving radio communication apparatus 12 or from the receiving radio communication apparatus 12 to the transmitting radio communication apparatus 10. On the other hand, the correspondence is not easily changed.

In a second scheme, the correspondence is transmitted as system information on a broadcast channel. For example, the correspondence may be changed in each cell by means of the broadcast channel. The correspondence stored in the pattern storing unit (103 in FIG. 4A) is transmitted to the receiving radio communication apparatus 12 on the broadcast channel (using a common control channel) and stored in the pattern storing unit (123 in FIG. 4B) in the receiving radio communication apparatus 12. According to the second scheme, multiple patterns for the correspondence can be maintained and the pattern can be easily changed. However, overhead can be increased compared to the first scheme.

In a third scheme, the correspondence is transmitted as Layer-3 signaling on a shared data channel upon establishing the call. The correspondence stored in the pattern storing unit (103 in FIG. 4A) is transmitted to the receiving radio communication apparatus 12 on the shared channel (the correspondence is input to the packet scheduling unit 105 in FIG. 4A along with user data and transmitted on the shared channel) and stored in the pattern storing unit (123 in FIG. 4B) in the receiving radio communication apparatus 12. According to the third scheme, different patterns for the correspondence can be used upon establishing each call. However, overhead can be increased compared to the first scheme.

Flowchart of a Retransmission Method

Figure 8:
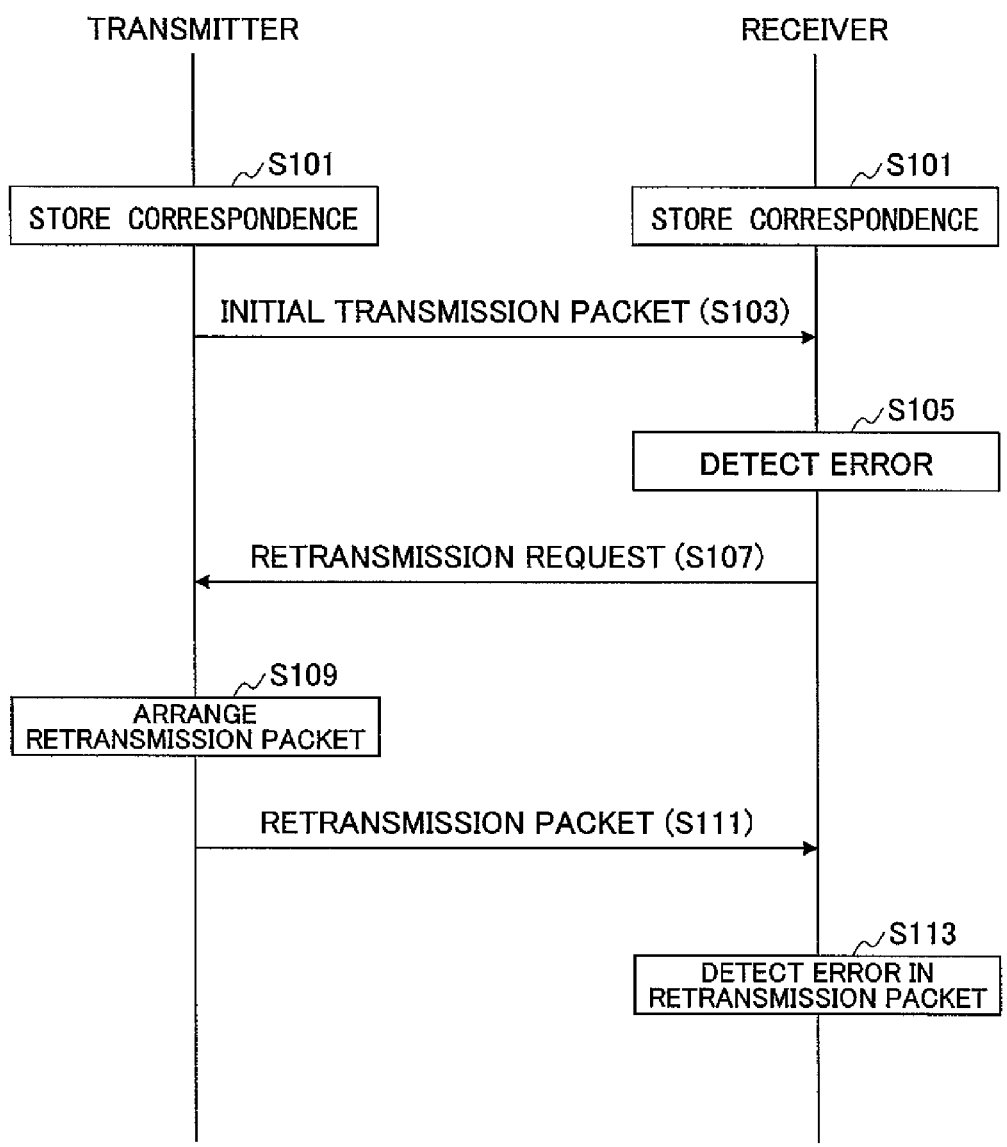
FIG. 8 shows a flowchart of a retransmission method in accordance with an embodiment of the present invention.

FIG. 8 shows a flowchart of a retransmission method in accordance with an embodiment of the present invention.

Both the transmitting communication apparatus (transmitter) 10 and the receiving communication apparatus (receiver) 12 store the correspondence between resource blocks used for a transmission packet and resource blocks used for a retransmission packet in advance (S101). The transmitting communication apparatus 10 transmits user data to the receiving communication apparatus 12 based on reception quality for the user (S103). The receiving communication apparatus 12 detects an error (S105) and transmits a retransmission request when the error is detected in the initial transmission packet (S107). The transmitting communication apparatus 10 arranges a retransmission packet based on the correspondence stored in the pattern storing unit (S109) and transmits the retransmission packet (S111). The receiving communication apparatus 12 detects an error based on the correspondence (S113) and transmits a retransmission request when the error is detected in the retransmission packet. Subsequently, steps S107-S113 are repeated as needed.

According to an embodiment of the present invention, a frequency diversity effect can be obtained for a retransmission packet and retransmission performance can be improved.

The present invention is not limited to the specifically disclosed embodiments, and variations and modifications may be made without departing from the scope of the present invention.

This international patent application is based on Japanese Priority Application No. 2006-009295 filed on Jan. 17, 2006, the entire contents of which are hereby incorporated herein by reference.

What is claimed is:

1. A radio communication apparatus comprising:
   a scheduling unit configured to determine a resource block for retransmission when a retransmission request signal is received from a receiving radio communication apparatus, based on an allocation pattern of resource blocks, where frames in which multiple resource blocks are arranged in a frequency direction are repeatedly formed in a time direction, using a frame number as a variable;
   a transmitting unit configured to transmit a packet according to the resource block for retransmission determined by the scheduling unit; wherein
   the scheduling unit determines the resource block for retransmission based on a remainder of a division of a resource block number for previous transmission plus a variation for the frame number by the number of resource blocks in the frequency direction.

2. The radio communication apparatus of claim 1, wherein the scheduling unit determines the allocation pattern based on a received broadcast channel.

3. The radio communication apparatus of claim 2, wherein the frame number is included in the broadcast channel.

4. The radio communication apparatus of claim 1, wherein the scheduling unit determines the allocation pattern based on a received shared data channel.

5. A transmission method comprising the steps of:
   determining a resource block for retransmission when a retransmission request signal is received from a receiving radio communication apparatus, based on an allocation pattern of resource blocks, where frames in which multiple resource blocks are arranged in a frequency direction are repeatedly formed in a time direction, using a frame number as a variable;
   transmitting a packet according to the determined resource block for retransmission, wherein
   the determining step comprises determining the resource block for retransmission based on a remainder of a division of a resource block number for previous transmission plus a variation for the frame number by the number of resource blocks in the frequency direction.

6. The transmission method of claim 5, wherein the determining step comprises determining the allocation pattern based on a received broadcast channel.

7. The transmission method of claim 6, wherein the frame number is included in the broadcast channel.

8. The transmission method of claim 5, wherein the determining step comprises determining the allocation pattern based on a received shared data channel.

* * * * *